United States Patent [19]

Van Buren, Jr. et al.

[11] Patent Number: 4,610,588
[45] Date of Patent: Sep. 9, 1986

[54] FASTENER CLIP

[75] Inventors: Harold S. Van Buren, Jr., Concord; Frederick A. Hammerle, Topsfield, both of Mass.

[73] Assignee: TRW, Inc., Cleveland, Ohio

[21] Appl. No.: 633,827

[22] Filed: Jul. 24, 1984

[51] Int. Cl.[4] .............................. F16B 37/02
[52] U.S. Cl. ..................... 411/173; 411/437; 411/516; 411/527
[58] Field of Search ............ 411/61, 74, 103, 105, 411/106, 111, 112, 113, 172, 173, 174, 175, 182, 427, 437, 516, 520, 522, 523, 524, 525, 526, 527, 528; 24/290, 293, 295, 297; 52/717, 718

[56] References Cited

U.S. PATENT DOCUMENTS

| | | | |
|---|---|---|---|
| 1,817,584 | 4/1931 | Rosenberg | 411/61 |
| 2,267,379 | 12/1941 | Tinnerman | 41/516 |
| 2,364,668 | 12/1944 | Simmons | 411/437 |
| 2,369,962 | 2/1945 | Gisondi | 411/523 |
| 2,370,375 | 2/1945 | Simmons | 411/437 |
| 2,389,278 | 11/1945 | Simmons | 411/437 |
| 2,390,752 | 12/1945 | Tinnerman | 411/112 |
| 2,567,884 | 9/1951 | Heath | 411/61 |
| 2,707,013 | 4/1955 | Flora et al. | 411/173 |
| 3,375,749 | 4/1968 | Coldren et al. | 411/15 |
| 4,175,303 | 11/1979 | Benedetti | 52/718 X |
| 4,300,865 | 11/1981 | Murray | 411/15 |

FOREIGN PATENT DOCUMENTS

| | | | |
|---|---|---|---|
| 1514108 | 1/1968 | France | 411/61 |
| 729217 | 1/1966 | Italy | 411/74 |
| 534564 | 3/1941 | United Kingdom | 411/427 |

Primary Examiner—Thomas J. Holko
Attorney, Agent, or Firm—Fay, Sharpe, Fagan, Minnich & McKee

[57] ABSTRACT

A fastener clip adapted for use with an associated fastener includes a head portion having an aperture through which the fastener extends. A pair of integral, spaced apart legs extend from one side of the head portion. Each leg includes first and second portions with the second portion being bent back upon the first portion in a position spaced outwardly thereof. A finger portion is located at a free end of the second portion and extends inwardly toward and through an aperture in the first portion. When a tension load is imposed on the clip, connecting zones between the first and second portions of each leg are deflected toward each other to apply a clamping force to a fastener extending therebetween. Also, the finger portions are shifted to positions which enhance seating of the clip in an associated workpiece.

17 Claims, 4 Drawing Figures

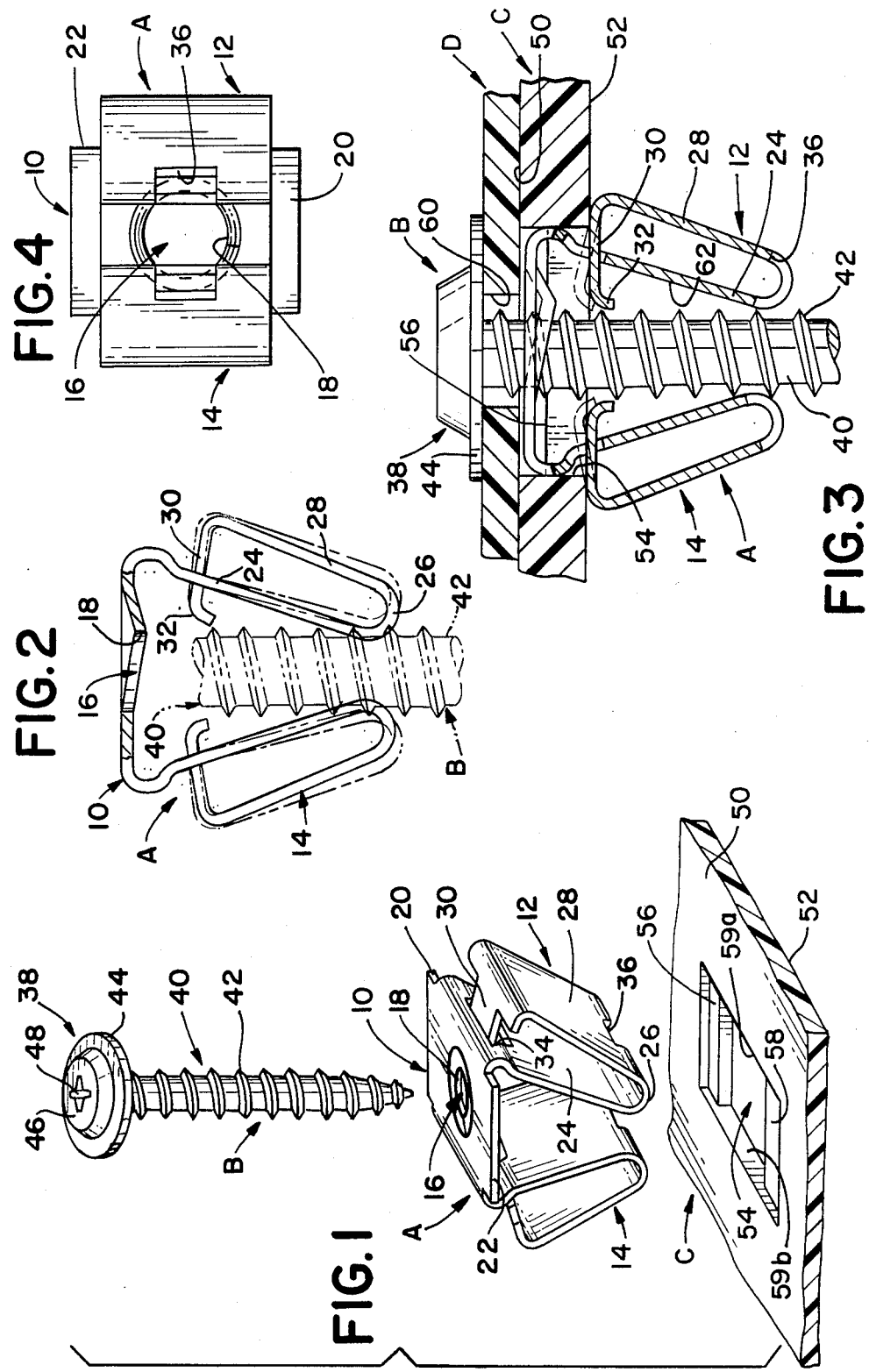

FASTENER CLIP

BACKGROUND OF THE INVENTION

This invention generally pertains to the art of blind fasteners. More specifically, the present invention relates to a fastener clip of the snap-mounted variety which cooperates with a fastener for connecting one part to another.

Blind fasteners are particularly useful in assemblies where only one side of a supporting part or workpiece is conveniently or readily accessible for attaching a fastener clip and applying a fastener to secure one or more other parts or workpieces to the supporting part. Such blind fasteners are often used to attach moldings, trim pieces, and the like to vehicle panels. Similarly, blind fasteners can also be used effectively to secure various components to vehicle instrument panels and the like. In many cases, the fasteners are formed with expansible retaining lugs or arms which are expanded upon being received in a workpiece opening and resiliently engage the edges of the opening for retaining the fastener clip in place.

One conventional type of blind fastener includes a fastener clip having a generally rectangular base portion and a pair of lateral arms extending from the sides of the base. The ends of the base project beyond the arms to define a clip head, and the central area of the base includes an internal thread for threadedly engaging a bolt or screw. The arms are bent to extend in the same general direction from the base, and are formed in slightly divergent relationship to define cam shoulders. Inner leg portions connected to and bent backwardly on the arms are also provided. The ends of the leg portions are bent outwardly to provide locking elements in the form of fingers which are disposed in line with apertures included in the outer arms of the clip.

The construction of the above prior device, however, does not include the capability for enhancing the gripping or retaining force exerted against a fastener member placed in cooperative association with the clip after the clip has been installed on a workpiece. Moreover, this prior construction does not include means which are activated when the fastener is inserted into the clip for enhancing retention of the clip in a workpiece or supporting part.

Other types of blind fasteners and fastener systems also are known in the prior art. These devices all have included various shortcomings or defects which render them undesirable for certain types of applications or installations. In addition, prior art blind fasteners and fastener systems have not been particularly effective for installation by robotic or automated assembly equipment.

It has, therefore, been considered desirable to develop a new and improved blind fastener arrangement which would provide greater retaining force on a fastener member and have greater retention capabilities when installed on a workpiece. Moreover, such new arrangement should be readily adapted to use with robotic or automated assembly equipment and should be adapted to use in many different applications. The subject invention is deemed to meet these needs and others, and provides a device which is cost effective and efficient to use in a variety of environments.

BRIEF SUMMARY OF THE INVENTION

In accordance with the present invention, a new and improved fastener clip is provided which can be inserted in a preformed opening in some workpiece or supporting body.

More particularly in accordance with the invention, the clip includes a head portion having an aperture through which an associated fastener may extend. A pair of integral, opposed legs extend from the head portion in a direction generally normal thereto. Each leg includes a first portion and a second portion which is bent back upon the leg first portion at a position disposed outwardly thereof. A finger portion is located at a free end of the leg second portion with the finger portion extending inwardly toward and through an aperture in the first portion. A connecting zone is provided between the first and second portions. The connecting zones of the pair of legs deflect toward each other for applying a clamping force to an associated fastener inserted therebetween when a tension load is imposed on the clip by an associated fastener at clip installation. At the same time, the fingers may be flexed slightly to enhance seating in the associated workpiece opening.

In accordance with another aspect of the invention, a hook portion is provided at a free end of each finger portion. These hook portions are adapted to engage the associated leg first portion adjacent the aperture included therein to define a maximum shifted position of the leg second portions when the clip is placed under a tension load.

According to another aspect of the invention, the hook portions preclude entry of an associated fastener into the clip until the leg second portions have properly seated behind the opening in an associated workpiece for insuring proper clip seating.

According to still another aspect of the invention, the fastener clip is provided with thread engaging means positioned adjacent the head portion aperture and adapted to engage an associated threaded fastener.

According to a further aspect of the invention, the first portions of the pair of legs have a first, normal spacing which is less than the diameter of an associated fastener. The first portions are adapted to be flexed outwardly away from each other as the fastener passes therebetween. Such action and relationships enhance gripping of the fastener.

The principal advantage of the present invention is the provision of a new and improved fastener clip which is very effective and adapted to use in a variety of different applications.

Another advantage of the invention resides in such a fastener clip which provides improved gripping on an associated fastener retainingly received thereby.

Still another advantage of the invention is the provision of a fastener clip which is shiftable to an enhanced retaining condition when fully installed on an associated workpiece.

Yet a further advantage of the invention resides in a new fastener clip which may be readily used with robotic or automated assembly equipment.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 1 is an exploded perspective view of the preferred embodiment of the subject new fastener clip along with an associated fastener and workpiece;

FIG. 2 is a side elevational view of the fastener clip in partial cross-section with an associated fastener and the clip legs shown in phantom for illustrating outward movement of the legs;

FIG. 3 is a side elevational view in partial cross-section showing the new fastener clip in an installed, retaining relationship with a pair of workpieces with the finger portions of the legs shown in phantom for illustrating flexure thereof; and, FIG. 4 is a bottom view of the fastener clip.

DETAILED DESCRIPTION OF THE PREFERRED EMBODIMENT

Referring now to the drawings, wherein the showings are for purposes of illustrating a preferred embodiment of the invention only and not for purposes of limiting same, FIG. 1 shows the subject new retainer clip A, a threaded fastener B, and a supporting body or workpiece C. While the fastener clip is primarily designed for and will hereinafter be described in connection with fastening together automotive body components, it will be appreciated that the overall inventive concept could be adapted to use in many other fastening environments.

More particularly, fastener clip A includes a base 10 having spaced apart first and second legs 12, 14 integral therewith and extending in spaced relation from one side thereof. Legs 12, 14 are angled or canted soemwhat toward each other for reasons which will become apparent. Base 10 is provided with a centrally located fastener receiving opening 16 wherein the edge of the opening defines a thread engaging element 18. The base is also provided with a pair of opposed flanges 20, 22 which locate the clip in an aperture of workpiece C. In the preferred embodiment here under discussion, clip A is fabricated from a suitable spring steel, although other materials could also satisfactorily be employed.

Element 18 may be formed as a single continuous helicoidal surface so that base 10 would be the equivalent of a single start threaded nut. Alternately, element 18 may have portions which would be parts of two different helicoidal surfaces so that the base would be the equivalent of a two start threaded nut.

With reference to first and second legs 12, 14, it is to be appreciated that these legs are identical. For ease of description, only first leg 12 will be described in detail, it being appreciated that second leg 14 is identical thereto unless otherwise specifically noted. More particularly, leg 12 is provided with a first portion 24 having an arcuate connecting zone 26 leading to a second portion 28. Second portion 28 is bent back upon the first portion 24 and is positioned outwardly thereof. A finger portion 30 is located at a free end of the leg second portion with a hook portion 32 (FIG. 2) being provided at a free end of the finger portion. Finger portion 30 extends back toward leg first portion 24 and through an aperture 34 therein such that the hook portion is disposed inwardly of leg first portion 24. An aperture 36 is advantageously provided in connecting zone 26 intermediate the leg first and second portions for reasons to be described.

Continuing with primary reference to FIG. 1, fastener B may comprise a bolt or a stud and is adapted to be retainingly received by clip A. As shown, the fastener is provided with a conventional head 38 and an elongated shank 40 having helical threads 42 extending axially therealong. Threads 42 are adapted to threadedly cooperate with thread engaging element 18 of the fastener clip. An enlarged flange 44 may advantageously be included at or as a part of fastener head 38 with such flange being useful to better enable the fastener to secure one workpiece to another. The top surface 46 of the fastener includes a slot 48 which is adapted to receive a conventional driving tool, eg., a screwdriver or the like, (not shown).

Workpiece or supporting body C may comprise any type of material including metals and plastics, and includes opposed first and second surfaces 50, 52 having a predetermined clip mounting aperture 54 communicating therebetween. In the preferred arrangement illustrated, workpiece C comprises a vehicle component such as an instrument panel which is molded or otherwise formed from plastic so as to include aperture 54. As shown, the aperture includes opposed, recessed flanges 56, 58 adapted to support clip A at opposed clip flanges 20, 22. The depth of flanges 56, 58 from workpiece surface 50 is greater than the thickness of clip base portion 10 to facilitate tensioning of the clip at installation for reasons to be described. Aperture 54 is dimensioned to receive the fastener clip in such manner that at least second portions 28 of legs 12, 14 are flexed inwardly in order to pass therethrough between opposed side edges 59a, 59b of aperture 54. Thereafter, the legs flex outwardly to assume a retaining position in which the clip is secured in the aperture. The clip is dimensioned at manufacture to properly accommodate the thickness of workpiece C, and installation of the clip may be easily effected by a pushing type of action. It is to be appreciated, however, that the concept of the subject invention is equally adapted to use with apertures of different types and styles than the aperture 54 shown in the FIGURES.

In the case of an incomplete or non-uniform insertion of the clip A in workpiece aperture 54, fastener B will be unable to pass by the fastener leg hook portions 32 since the hook portions will be urged toward each other due to the relative dimensioning between the through portion of aperture 54 and the clip. This out-of-order condition may be detected or sensed by robotic or automatic assembly equipment in order that appropriate corrective action may be taken. Ideally, however, the force used to drive fastener B will cause the fastener point to effect spreading of legs 12, 14 thereby seating the fastener, even if finger portions 30 have difficulty passing below surface 52. When properly installed, base portion 10 supports and retains the clip adjacent one side of workpiece C, and finger portions 30 support and retain the clip adjacent the other side of the workpiece.

It should be appreciated that flange portions 20, 22 of the fastener clip provide base 10 with an overall dimension which is greater than the through portion of aperture 54, and that the overall dimension of the aperture is greater than base 10 in order that the base may be received therein. Flanges 20, 22 thus engage aperture flanges 56, 58 and prevent movement of the base completely through aperture 54. Once installed, legs 12, 14 prevent clip withdrawal from the aperture. Although supporting body C is illustrated as a planar sheet of material, it will be appreciated that it could have any other desired geometric conformation without in any way departing from the overall intent or scope of the invention.

With reference now to FIG. 2, it will be seen from the solid line view of clip A that connecting zones 26 of first and second legs 12, 14 have a first, normal spacing which is less than the diameter of the threaded shank on fastener B. Legs 12, 14 will thus be flexed outwardly to the position shown in phantom as the fastener is threadedly inserted therebetween. Such outward flexing has the additional advantage of even more securely locking clip A in place in workpiece aperture 54.

Fastener clip A is shown in FIG. 3 as being secured to workpiece C while fastener B, in turn, is used for securing a second workpiece D to workpiece C. A suitable aperture 60 is provided in the second workpiece to accommodate passage of fastener B therethrough into clip A. A number of different types or configurations for this aperture may suitably be employed to facilitate various alternative installation procedures for the fastener assembly. For example, aperture 60 may be undercut slightly so as to eliminate the need for having recessed flanges 56, 58 in workpiece C.

To adequately secure second workpiece D to workpiece C, a tension load is imposed on fastener clip A by fastener B as the fastener is threadedly advanced into the clip. This tension load has a tendency to lift or draw base portion 10 upwardly from supported association with aperture flanges 56, 58. A small amount of such lifting or drawing is accommodated due to the fact that the depth of these flanges from workpiece surface 50 is greater than the thickness of the clip base portion. During tensioning, fingers 30 of legs 12, 14 engage second surface 52 of workpiece C and deflect connecting zones 26 of legs 12, 14 toward each other for applying a clamping force to fastener shank 40.

Also, the tension force will simultaneously tend to move the leg second portions 28 outwardly away from each other. Such outward movement will tend to move fingers 30 outwardly through apertures 34 in leg portions 24. This movement may continue until hook portions 32 contact the inner surface 62 of the associated leg first portion 24. Fingers 30 will also be moved downwardly from the phantom line position to the solid line position in FIG. 3. Such movement may continue until the fingers bottom out on the lower edges of apertures 34, and acts to more securely seat the fastener clip within workpiece aperture 54.

With reference now to FIG. 4, connecting zone 26 of each leg 12, 14 may have an aperture 36 located therein. Such apertures are useful as fastener holding or guide means since they cooperate with fastener shank 40 to prevent fastener wobbling in clip A. As previously noted, legs 12, 14 are angled somewhat toward each other and facilitate engagement of the fastener shank by zones 26. Clip aperture 16 may be slightly undersized to preclude the fastener from vibrating loose and falling out, particularly if the material to be clamped is soft or subject to cold flow, thus causing reduction and eventual elimination of the clamp load. Under such conditions, the fastener is free to vibrate and eventually fall from association with the clip. In other situations, aperture 16 is dimensioned to receive fastener B in a free running relationship. Such relationship reduces the torque required for installation and is important when the fastener is to be hand torqued.

The subject invention provides a fastener clip cooperable with a fastener for mounting or retaining one workpiece to another. As fastener B penetrates opening 16 of the fastener clip, it engages the leg first portions 24 and drives them outwardly a predetermined distance. This outward movement causes clip A to be more securely seated in workpiece aperture 54, and causes the fastener to be firmly gripped by the clip. When a tension load is imposed on the clip by tightening the fastener, connecting zones 26 are caused to be urged inwardly to better grip the fastener while, at the same time, finger portions 30 move outwardly and downwardly. Such outward and downward movement ensures even better seating of fastener clip A in workpiece aperture 54. The presence of the fastener B prevents two legs 12, 14 from collapsing so that the clip cannot be withdrawn from aperture 54.

In some cases, clip A of the subject invention also has the capability of seating itself following installation. With automated or robotic assembly, it is difficult to assure that the plane of fastener head 38 always is in a plane parallel to workpiece surface 50. Typically, the surface is nearly parallel when the clip approaches aperture 54. Because of spring legs 12, 14, the clip exerts pressure on the associated workpiece during actual insertion. Since, in many cases, workpiece C may be narrow and unsupported, the force of insertion causes deflection of the panel and loss of parallelism. The clip is thus cocked in the workpiece, and most automated installation equipment have poor means to correct for this condition. The clip will, however, maintain itself in the workpiece since legs 12, 14 are binding on walls 59a, 59b of aperture 54. A similar condition could also occur if aperture 54 had some minor interference therearound, eg., flash or the like.

When workpiece D is thereafter applied with fastener B being inserted into the clip, the axial pressure exerted by the screw driving device or other tool may properly seat the clip. The subject clip is designed such that the point of fastener B, following insertion into receiving opening 16, meets with mechanical interference caused by free ends or hooks 32 of legs 12, 14 to prohibit further entry by virtue of leg second portions 28 interfering with the walls of workpiece aperture 54. When fastener B is rotated further, the point passes between hooks 32 and exerts substantial radial pressure on finger portions 30. The inclined plane of the fastener point combined with the axial force of the screw driving device or tool causes clip legs 12, 14 to move radially outward and lodge beneath workpiece underside 52. The clip thus gives assurances that if fastener B is received, clip A is properly seated in the associated workpiece and will meet performance requirements. Such assurances are particularly important for when robotic or automated assembly equipment is used.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A fastener clip adapted to receive an associated fastener, said clip comprising:

a head portion having an opening therethrough adapted to receive the shank of the associated fastener from adjacent one side of an associated workpiece; a pair of spaced apart legs integral with said head portion and extending outwardly from one face thereof; and, each leg including a first portion, a second portion bent back upon said first portion outwardly thereof, a finger portion disposed at a free end of said second portion extending inwardly toward and through an aperture in said first portion to a point sufficient to prevent inward deflection of said second leg portions when the shank of an associated fastener is received in said fastener clip, and a connecting zone intermediate said first and second portions, said connecting zones deflecting toward each other for applying a clamping force to the shank of an associated fastener extending therebetween when a tension laod is imposed on said clip generally normal to the plane of said head portion.

2. The fastener clip of claim 1 wherein said finger portions are adapted to flex in a direction away from said head portion when said clip is placed under a tension load in an installed condition in an associated workpiece.

3. The fastener clip of claim 2 wherein said apertures in said leg first portions are adapted to limit flexure of said finger portions.

4. The fastener clip of claim 1 further including fastener engaging means at said head portion aperture for retainingly engaging the shank of an associated fastener.

5. The fastener clip of claim 1 wherein the first portions of said pair of legs have a first normal spacing less than the diameter of an associated fastener, said first portions adapted to be flexed outwardly in response to a fastener shank being passed therebetween.

6. The fastener clip of claim 1 further including an aperture in each of said connecting zones, said apertures adapted to cooperate with a fastener shank passing between said legs for stabilizing the fastener in said clip.

7. The fastener clip of claim 1 including hook means carried by each finger portion for engaging said fastener shank and producing outward deflection of said second leg portion as said fastener is threaded into said fastener clip.

8. The fastener clip of claim 7 wherein said hook means carried by each finger portion have an end extending toward said connecting zone.

9. A fastener clip adapted to receive a threaded fastener for interconnecting a pair of workpieces, said clip comprising:

a head portion having a threaded opening extending therethrough adapted to threadedly receive the shank of an associated threaded fastener adjacent one area of an associated workpiece; a pair of legs extending outwardy from one face of said head portion in spaced relation to each other; and, said pair of legs each including a first portion, a second portion bent back upon said first portion at a position outwardly thereof, a finger portion disposed at a free end of said second portion extending inwardly through an aperture in said first portion, a hook portion disposed at a free end of said finger portion, and a connecting zone intermediate said leg first and second portions, said connecting zones of said pair of legs deflecting toward each other for applying a clamping force to the shank of an associated threaded fastener extending therebetween and said hook portions adapted to engage said first portions to define a limit for outward movement of said finger portions relative to said first portions when said clip is placed under a tension load in an aperture of an associated workpiece with said finger portions in retaining engagement with another area of the associated workpiece spaced from the one area.

10. The fastener clip of claim 9 including an aperture in each connecting zone, said apertures adapted to cooperate with the shank of a threaded fastener passing between said legs to stabilize the fastener in said clip.

11. The fastener clip of claim 9 wherein said connecting zones are normally spaced apart by a distance which is less than the diameter of the shank of an associated fastener so that said connecting zones are flexed outwardly by a fastener shank passing therebetween.

12. The fastener clip of claim 9 wherein said finger portions are adapted to flex in a direction away from said head portion when said clip is placed under a tension load in an installed condition in an associated workpiece, said apertures in said leg first portions limiting flexure of said finger portions.

13. A fastener assembly comprising:

a fastener having a head and an elongated threaded shank; a fastener clip having a head portion including a threaded aperture therethrough threadedly receiving said fastener shank, said head portion including means adapted to retain said clip in a mounted position adjacent one area of an associated workpiece; and, a pair of integral legs extending in spaced relation to each other outwardly from one side of said head portion, each leg including a first portion, a second portion which is bent back upon said first portion outwardly thereof, a finger portion located at a free end of said second portion adapted to retain said clip in a mounted position adjacent another area of an associated workpiece spaced some predetermined distance from the one area and extending inwardly toward and through an aperture in said first portion to a position to engage with the shank of said fastener when said fastener is in said fastener clip and to produce outward deflection of said second leg portion, and a connecting zone between said leg first and second portions, said connecting zones deflecting toward each other as said shank is threadedly advanced into said fastener clip.

14. The fastener assembly of claim 13 wherein said finger portions are adapted to flex away from said head portion when said clip is placed under tension in an installed condition on an associated workpiece, flexure of said finger portions being limited by said apertures in said leg first portions.

15. The fastener assembly of claim 13 wherein retaining means comprises flanges extending oppositely outward from said head portion.

16. A fastener clip adapted to receive an associated fastener, said clip comprising:

a head portion having an opening therethrough adapted to receive the shank of the associated fastener from adjacent one side of an associated workpiece; a pair of spaced apart legs integral with said head portion and extending outwardly from one face thereof; and, each leg including a first portion, a second portion bent back upon said first portion outwardly thereof, a finger portion disposed at a free end of said second portion extending inwardly toward and through an aperture in said first portion, a connecting zone intermediate said first and second portions, said connecting zones deflecting toward each other for applying a clamping force to the shank of an associated fastener extending therebetween when a tension load is imposed on said clip generally normal to the plane of said head portion; and, a hook portion disposed at a free end of each finger portion, said hook portion adapted to engage the associated first leg adjacent the aperture therein for limiting outward deflection of said finger portion relative to said first portion when the clip is placed under a tension load.

17. A fastener assembly comprising:

a fastener having a head and an elongated threaded shank; a fastener clip having a head portion including a threaded aperture therethrough threadedly receiving said fastener shank, said head portion including means adapted to retain said clip in a mounted position adjacent one area of an associated workpiece; and, a pair of integral legs extending in spaced relation to each other outwardly from one side of said head portion, each leg including a first portion, a second portion which is bent back upon said first portion outwardly thereof, a finger portion located at a free end of said second portion adapted to retain said clip in a mounted position adjacent another area of an associated workpiece spaced some predetermined distance from the one area and extending inwardly toward and through an aperture in said first portion, a connecting zone between said leg first and second portions, said connecting zones deflecting toward each other for applying a clamping force on the threaded shank of said fastener as said shank is threadedly advanced for imparting a tension load on said clip; and, a hook portion at a free end of said finger portions for limiting outward deflection of said finger portions relative to said leg first portions when said clip is placed under a tension load.

* * * * *